(No Model.)

G. W. PHENIX.
EYEGLASS SPRING.

No. 249,666. Patented Nov. 15, 1881.

WITNESSES
John A. Ellis,
Philip Cellasi.

INVENTOR
Geo. W. Phenix
by Anderson & Smith
his ATTORNEYS

N. PETERS. Photo-Lithographer, Washington, D. C.

UNITED STATES PATENT OFFICE.

GEORGE W. PHENIX, OF NEW BRUNSWICK, ASSIGNOR OF ONE-HALF TO ISAAC V. VANNOSDALEN, OF MILLTOWN, NEW JERSEY.

EYEGLASS-SPRING.

SPECIFICATION forming part of Letters Patent No. 249,666, dated November 15, 1881.

Application filed August 23, 1881. (No model.)

*To all whom it may concern:*

Be it known that I, GEORGE W. PHENIX, a citizen of the United States, a resident of New Brunswick, in the county of Middlesex and State of New Jersey, have invented a new and valuable Improvement in Eyeglasses; and I do hereby declare that the following is a full, clear, and exact description of the construction and operation of the same, reference being had to the annexed drawings, making a part of this specification, and to the letters and figures of reference marked thereon.

Figure 1:
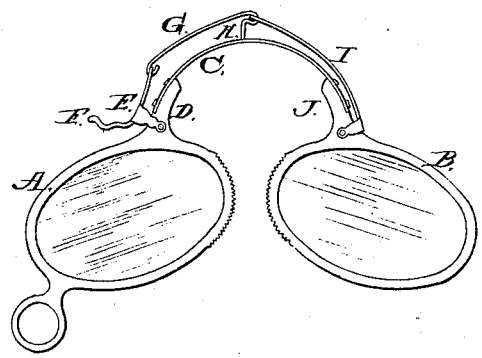
Figure 2:
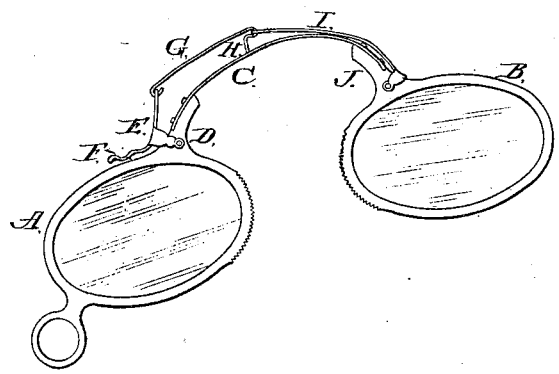

Figure 1 of the drawings is a representation of a front view of my invention before being placed upon the nose, and Fig. 2 is a similar view when in the act of being placed upon the nose.

This invention has relation to eyeglasses; and it consists in the novel construction and arrangement, in connection with the spring and frames of a pair of eyeglasses, of a lever pivoted to the arm of one of the frames and connected by a hinged arm provided with a downwardly-projecting arm to another arm secured to the other frame, the two arms connecting the frames of the glasses being hinged about midway of the spring, and the downwardly-projecting arm being adapted to press upon the connecting-spring when the lever is operated, for the purpose of widening the space between the frames to permit the eyeglasses to be readily placed upon the nose, as will hereinafter be fully described and claimed.

Referring by letter to the accompanying drawings, A and B designate the frames of the eyeglasses, connected by the spring C, in the usual manner.

To the arm D of the frame A, a lever, E, having a finger-piece, F, is pivoted. To this lever is hinged an arm, G, having a downwardly-projecting short arm, H. Another arm, I, is secured to the arm J of the frame B, and is also hinged to the arm G, as shown.

By taking the glasses in the hand and pressing the finger-piece F with the forefinger the short arm H will be pressed upon the connecting-spring C, and the two arms G and I draw the frame B away from the frame A, thereby widening the space between the frames and permitting the glasses to be readily placed upon the nose of the wearer.

Having thus fully described my invention, what I claim as new, and desire to secure by Letters Patent, is—

The combination, with the frames A and B, and the spring C, of the lever E, having finger-piece F, and the hinged arms G and I, the former having the stop or arm H, substantially as and for the purpose set forth.

In testimony that I claim the above I have hereunto subscribed my name in the presence of two witnesses.

GEORGE W. PHENIX.

Witnesses:
ALBERT S. BLUE,
ISAAC V. VANNOSDALEN.